Figure 1:
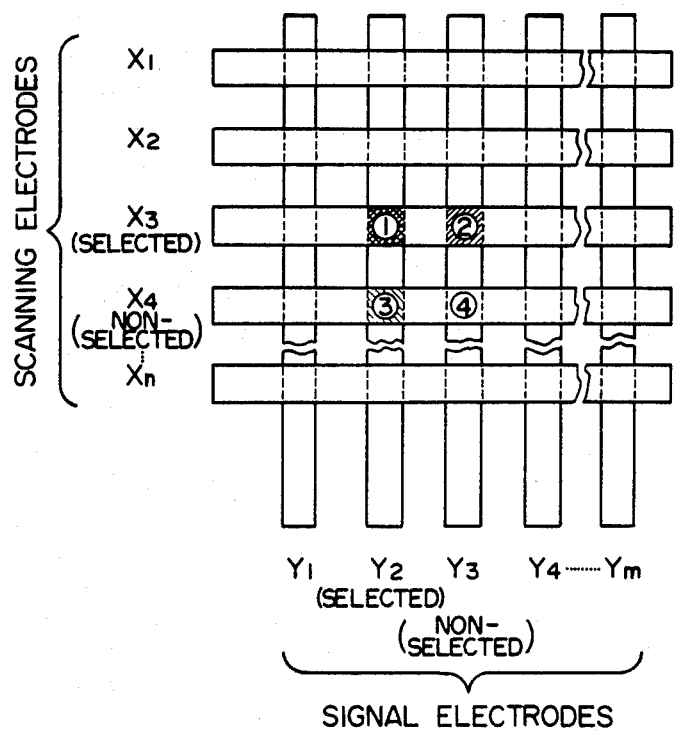

United States Patent [19]

Fujita et al.

[11] Patent Number: 4,670,182

[45] Date of Patent: Jun. 2, 1987

[54] NEMATIC LIQUID CRYSTALLINE COMPOSITION

[75] Inventors: Yutaka Fujita, Urawa; Kiyohumi Takeuchi, Tokyo, both of Japan

[73] Assignee: Dainippon Ink and Chemicals, Inc., Tokyo, Japan

[21] Appl. No.: 788,948

[22] Filed: Oct. 18, 1985

[30] Foreign Application Priority Data

Oct. 19, 1984 [JP] Japan .................. 59-218529
Oct. 19, 1984 [JP] Japan .................. 59-218530

[51] Int. Cl.⁴ .................. C09K 19/34; C09K 19/06; C09K 19/30; C09K 19/20
[52] U.S. Cl. .................. 252/299.61; 252/299.63; 252/299.6; 252/299.67; 252/299.66; 252/299.5; 350/350 R; 350/333
[58] Field of Search .................. 252/299.61, 299.63, 252/299.66, 299.67, 299.6, 299.01; 350/350 R, 333

[56] References Cited

U.S. PATENT DOCUMENTS

| | | | |
|---|---|---|---|
| 3,925,482 | 12/1975 | Jacques | 252/299.6 |
| 4,253,740 | 3/1981 | Raynes et al. | 252/299.63 |
| 4,372,871 | 2/1983 | Toriyama et al. | 252/299.63 |
| 4,391,730 | 7/1983 | Kuschel et al. | 252/299.67 |
| 4,551,264 | 11/1985 | Eidenschink et al. | 252/299.61 |
| 4,556,745 | 12/1985 | Carr et al. | 252/299.63 |
| 4,588,518 | 5/1986 | Nakagoni et al. | 252/299.61 |

FOREIGN PATENT DOCUMENTS

| | | | |
|---|---|---|---|
| 2846409 | 6/1979 | Fed. Rep. of Germany | 252/299.61 |
| 2067586 | 7/1981 | United Kingdom | 252/299.61 |
| 2092169 | 8/1982 | United Kingdom | 252/299.63 |
| 2655465 | 9/1985 | United Kingdom | 252/299.6 |

OTHER PUBLICATIONS

Dubois et al. MCLC, vol. 27, 1974, pp. 187–198.

Primary Examiner—Teddy S. Gron
Assistant Examiner—J. E. Thomas
Attorney, Agent, or Firm—Sherman and Shalloway

[57] ABSTRACT

A nematic liquid crystalline composition comprising (a) a compound represented by the general formula

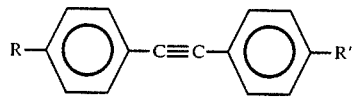

wherein R represents a linear alkyl group having 1 to 10 carbon atoms, and R' represents a linear alkyl group having 1 to 10 carbon atoms or a linear alkoxy group having 1 to 10 carbon atoms,
(b) a compound represented by the general formula

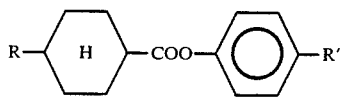

wherein R is as defined, and R' represents a linear alkoxy group having 1 to 10 carbon atoms,
(c) at least one compound selected from compounds represented by the general formula

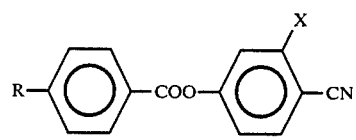

wherein R is as defined, and X represents a hydrogen, fluorine or chlorine atom,
and compounds represented by the general formula

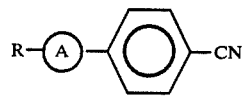

wherein R represents a linear alkyl group having 1 to 10 carbon atoms, and (Abstract continued on next page.)

4,670,182
Page 2
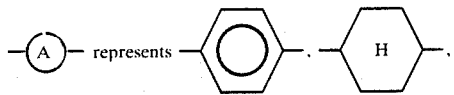 represents 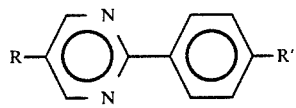,
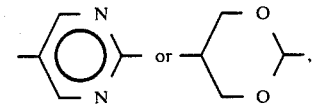
and optionally a compound represented by the general formula
$$R-\underset{N}{\underset{\|}{\bigcirc}}-\bigcirc-R'$$
wherein R is as defined, and R' represents a linear alkoxy group having 1 to 10 carbon atoms.
4 Claims, 3 Drawing Figures

① SELCTED POINT (ON)

② ③ ④ } NON-SELCTED POINT (OFF)

OPERATION MARGIN $\alpha$ IN $1/a$ BIAS METHOD
$a = \sqrt{N} + 1$

NEMATIC LIQUID CRYSTALLINE COMPOSITION

This invention relate to a liquid crystalline composition suitable as a material for use in field effect mode liquid crystal display elements, particularly display elements according to the high level multiplexing driving method.

Liquid crystal display elements have long been used in digital watches and portable electronic calculators, and recently their application has been expanded to display devices of larger sizes capable of displaying more information, such as portable computers, portable television sets, and various measuring instruments for office use. One driving method meeting such a need is a multiplexing driving method based on a voltage averaging technique, and liquid crystal display elements adapted for operation by the high time division multiplex driving method are now on the market. Consequently, liquid crystalline compositions suitable for the high level multiplexing driving method are desired, but many of the conventional compositions do not conform to this driving method.

The characteristics generally required of a liquid crystalline composition used in display elements are, for example, as follows.

(1) It should be liquid crystalline over a wide temperature range in the vicinity of room temperature.
(2) It should be chemically and thermochemically stable.
(3) It should be of relatively low viscosity.
(4) It should vary little in voltage-luminance characteristics with changes in temperature and visual field.
(5) It should have sharp voltage-luminance characteristics.

Figure 2:
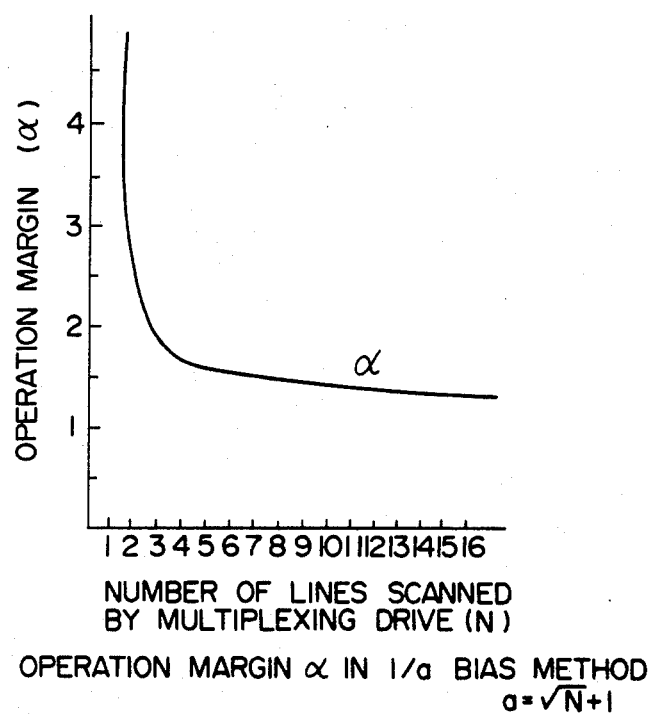
Figure 3:
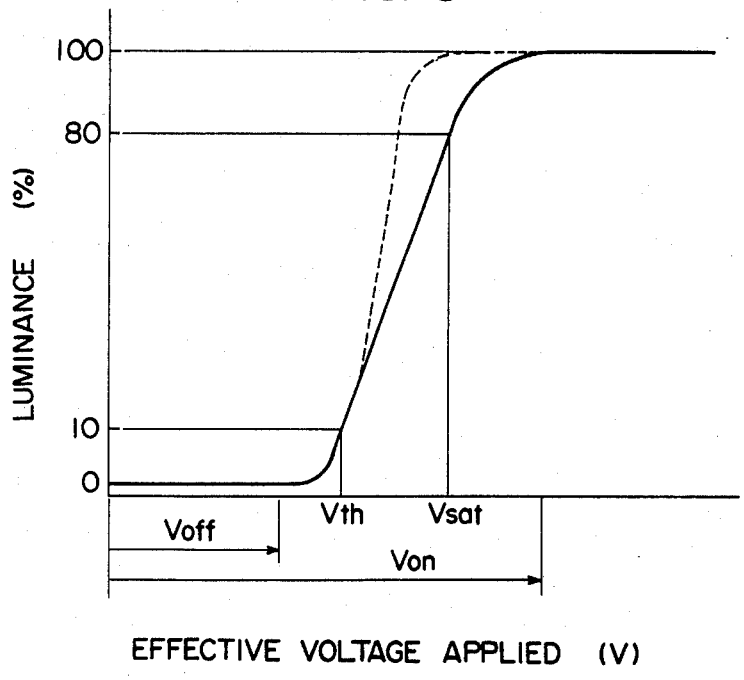

In performing high level multiplexing driving, the characteristic (5) is particularly important. This will be explained at some length below with reference to the accompanying drawings, In the accompanying drawings, FIG. 1 is a top plan view of a dot matrix display element for explaining the multiplexing driving method;

FIG. 2 is a diagram showing the relation between the operation margin of a liquid crystal display element and the number of lines scanned by multiplexing drive; and FIG. 3 is a diagram showing the relation between the luminance of a liquid crystal display element and an effective voltage applied.

As shown in FIG. 1, electrodes $Y_1, Y_2, Y_3 \ldots Y_m$ (signal electrodes) are formed in a striped pattern on a lower plate, and electrodes $X_1, X_2, X_3 \ldots X_n$ (scanning electrodes) are also formed in a striped pattern on an upper plate which is spaced a fixed distance from the lower plate. Displaying of letters and figures are carried out by selectively turning liquid crystals at the crossing points of the X and Y electrodes on and off. When a certain scanning electrode ($X_3$ in FIG. 1) is selected, on or off display signals according to a signal to be displayed are simultaneously applied to all pixels on the selected scanning electrode from signal electrodes $Y_1$, $Y_2 \ldots Y_m$. In other words, the crossing points of the scanning electrodes and the signal electrodes are turned on or off by combinations of voltage pulses applied to these scanning electrodes and signal electrodes. Hence, for example, voltage is applied to the off-points ②, ③ and ④ in addition to the on-point ①. A high effective voltage is applied to an on-point, and a low effective voltage, to an off-point. By creating the on and off states by the difference in these voltages, the letters and figures are displayed. The voltage of an on-point has a correlation with the voltage of an off-point, and this relation can be expressed by the following equations.

Effective voltages applied to an on-point $$V_{on} = \frac{V_o}{a} \sqrt{\frac{a^2 + N - 1}{N}}$$

Effective voltage applied to and off-point $$V_{off} = \frac{V_o}{a} \sqrt{\frac{(a - 2)^2 + N - 1}{N}}$$

Operation margin $$a = V_{on}/V_{off} = \sqrt{\frac{a^2 + (N - 1)}{(a - 2)^2 + (N - 1)}} = \sqrt{\frac{\sqrt{N} + 1}{\sqrt{N} - 1}}$$

$V_o$: the voltage of a driving power supply
a: bias ratio
N: the number of lines scanned by multiplexing drive FIG. 2 shows the relation between the number (N) of lines scanned by multiplexing drive and the operation margin ($\alpha$). It is seen from this diagram that with increasing N, $\alpha$ approaches 1. In other words, in the high time division multiplex driving method, the difference between the voltage of an on-point and that of an off-point becomes extremely small.

The general voltage-luminance characteristics of liquid crystals in the field effect mode display are shown by the curve in FIG. 3. To obtain good display by the time division multiplex driving method, it is necessary that the effective voltage ($V_{on}$) applied to an on-point should be equal to, or higher than, the saturation effective voltage ($V_{sat}$), and that the effective voltage ($V_{off}$) applied to an off-point should be equal to, or higher than, the threshold effective ($V_{th}$). Hence, the equation $$V_{sat}/V_{th}(=\gamma) \leq V_{on}/V_{off}(\alpha)$$

should be satisfied. The use of a liquid crystalline composition which causes $\gamma > \alpha$ produces deleterious effects on displaying such as a reduction in the density of display or the occurrence of crosstalk. There is no fixed standard of luminance in the art on which $V_{sat}$ or $V_{th}$ is set. Generally, an effective voltage which gives a certain luminance within the range of 50 to 90% is set as $V_{sat}$ (in FIG. 3, the luminance for $V_{sat}$ is set at 80%), and an effective voltage which gives a certain luminance within the range of 10 to 20% is set as $V_{th}$ (in FIG. 3. the luminace for $V_{th}$ is set at 10%). In any case, since the alpha value decreases with increasing number of lines scanned by the time division, the gamma value should also decrease. In other words, in the high level multiplexing driving method, a liquid crystalline composition having a small gamma value is required. Specifically, as shown by the dotted line in FIG. 3, such a liquid composition changes sharply in luminance with a slight change in applied voltage.

As another problem, an interference color of light sometimes appears on a display surface in a liquid cell filled with a liquid crystalline composition having a small optical anisotropy Δn. This may be prevented, for example, by increasing the cell gap (the thickness of the liquid crystalline layer), or by adding another type of liquid crystals having large Δn and thus increasing the Δn of the composition as a whole. Such methods sometimes may adversely affect response and multiplexing driving characteristics.

It is an object of this invention to provide a liquid crystalline composition having the aforesaid characteristics (1) to (4) and particularly the sharp voltage-luminance characteristics (5) above.

Another object of this invention is to provide a liquid crystalline composition which has a large optical anisotropy and when filled in a cell, does not permit formation of an inteference color of light on a display surface.

These objects are achieved in accordance with this invention by a nematic liquid crystalline composition [to be referred to as the liquid crystalline composition (I)] comprising of (a) a compound [to be referred to as the compound (1)] represented by the general formula

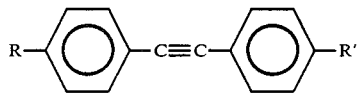  (1)

wherein R represents a linear alkyl group having 1 to 10 carbon atoms, and R' represents a linear alkyl group having 1 to 10 carbon atoms or a linear alkoxy group having 1 to 10 carbon atoms, (b) a compound [to be referred to as the compound (2)] represented by general formula

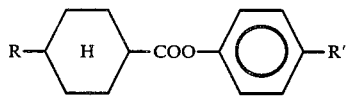  (2)

wherein R represents a linear alkyl group having 1 to 10 carbon atoms, R' represents a linear alkoxy group having 1 to 10 carbon atoms, and (c) at least one compound selected from the group consisting of a compound [to be referred to as the compound (3)] represented by the general formula

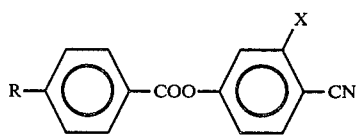  (3)

wherein R represents a linear alkyl group having 1 to 10 carbon atoms, and X represents a hydrogen, fluorine or chlorine atom, and a compound [to be referred to as the compound (4)] represented by the general formula

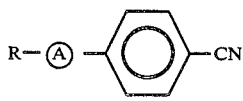  (4)

wherein R represents a linear alkyl group having 1 to 10 carbon toms, and

—(A)— represents ,

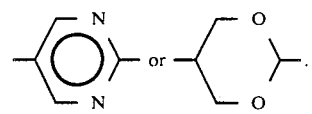

As a further improved liquid crystalline composition, the present invention provides a nematic liquid crystalline composition [to be referred to as the liquid crystalline composition (II)] comprising a compound [to be referred to as the compound (5)] represented by the general formula

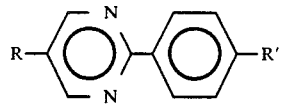  (5)

wherein R represents a linear alkyl group having 1 to 10 carbon atoms, and R' represents a linear alkoxy group having 1 to 10 carbon atoms.

an essential ingredient in addition to the essential ingredients, i.e. the compounds (1), (2), and (3) or/and (4), of the liquid crystalline composition (I).

The liquid crystalline compositions [I] and [II] of this invention may include other nematic liquid crystalline compounds in addition to the compounds (1) to (5) in amounts which do not impair the objects of this invention in order to control the threshold voltage, the liquid crystalline temperature range, the viscosity, etc. so as to conform to various requirements such as driving voltages, driving temperature ranges and the speed of response. The following compounds of general formulae (6) to (15) may be cited as typical examples of the other nematic liquid crystalline compounds suitable for use in this invention.

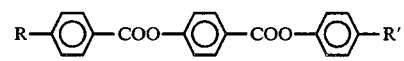  (6)

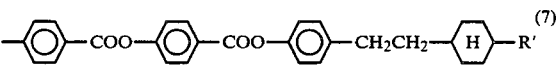  (7)

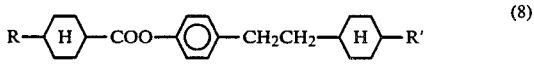  (8)

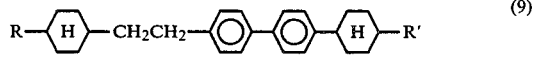  (9)

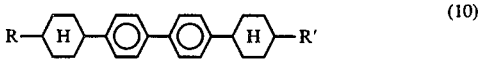  (10)

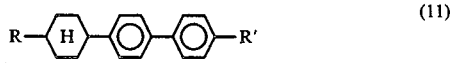  (11)

  (12)

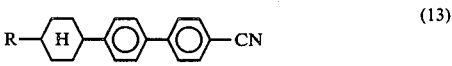  (13)

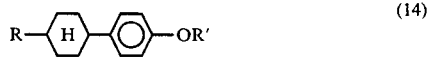  (14)

$$R-\langle O \rangle-COO-\langle O \rangle-OR' \quad (15)$$

In these formulae (6) to (15), R and R' each represent a linear alkyl group having 1 to 10 carbon atoms.

The preferred proportions of the ingredients constituting the liquid crystalline compositions of this invention are 10 to 45% for compound (1), 20 to 55% for compound (2), 5 to 35% for compounds (3) and (4) combined, and 0 to 25% for the other nematic liquid crystalline compound in the liquid crystalline composition (I); and 15 to 40% for compound (1), 5 to 40% for compound (2), 5 to 30% for compound (5), 5 to 40% for compounds (3) and (4) combined, and 0 to 20% for the other nematic liquid crystalline compound in the liquid crystalline composition (II).

The following examples illustrate the present invention more specifically.

For comparison, a phenylcyclohexane-type liquid crystalline composition widely used as a low-viscosity liquid crystalline composition (Comparative Example 1), and a biphenyl-type liquid crystalline composition widely used as a liquid crystalline composition having a large refractive index anisotropy (Comparative Example 2) are used. Thest two comparative liquid crystalline compositions are suitable for use in ½-¼duty multiplexing driving display (the number of lines scanned 2-4).

The abbreviations used in the following tables have the following meanings.

M.R.: liquid crystalline temperature range
$\Delta n$: optical anisotropy
$\Delta \epsilon$: dielectric anisotropy
$T_{NI}$: nematic phase-isotropic liquid phase transition temperature
$T_{SN}$: smectic phase-nematic phase transition temperature

TABLE 1

| Matrix designation | Matrix composition | Proportion (wt. %) | M.R. (°C.) | $\Delta n$ (25° C. 525 nm) | Viscosity (c.p./20° C.) | $\Delta \epsilon$ |
|---|---|---|---|---|---|---|
| FLVM-1 | $C_3H_7-\langle O \rangle-C\equiv C-\langle O \rangle-OC_7H_{15}$ | 25 | 42-66 | 0.26 | 33.3 | 0.06 |
|  | $C_4H_9-\langle O \rangle-C\equiv C-\langle O \rangle-OC_7H_{15}$ | 25 |  |  |  |  |
|  | $C_3H_7-\langle O \rangle-C\equiv C-\langle O \rangle-OC_5H_{11}$ | 25 |  |  |  |  |
|  | $C_5H_{11}-\langle O \rangle-C\equiv C-\langle O \rangle-OC_5H_{11}$ | 25 |  |  |  |  |
| FLVM-2 | FLVM-1 | 75 | 35-50 | 0.22 | 25.0 | 0.05 |
|  | $C_3H_7-\langle O \rangle-C\equiv C-\langle O \rangle-C_4H_9$ | 25 |  |  |  |  |
| PDM-1 | $C_6H_{13}-\langle N{=}N \rangle-\langle O \rangle-OC_6H_{13}$ | 50 | 16-59 | 0.163 | 69 | 0.65 |
|  | $C_6H_{13}-\langle N{=}N \rangle-\langle O \rangle-OC_9H_{19}$ | 50 |  |  |  |  |
| PDM-2 | $C_6H_{13}-\langle N{=}N \rangle-\langle O \rangle-OC_5H_{11}$ | 25 | 3-57 | 0.162 | 66 | 0.64 |

TABLE 1-continued

| Matrix designation | Matrix composition | Proportion (wt. %) | M.R. (°C.) | Δn (25° C. 525 nm) | Viscosity (c.p./20° C.) | Δε |
|---|---|---|---|---|---|---|
| | 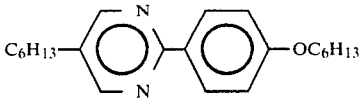 C$_6$H$_{13}$—(N,N-ring)—⌬—OC$_6$H$_{13}$ | 25 | | | | |
| | 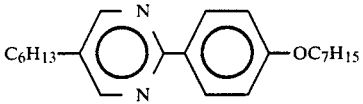 C$_6$H$_{13}$—(N,N-ring)—⌬—OC$_7$H$_{15}$ | 25 | | | | |
| | 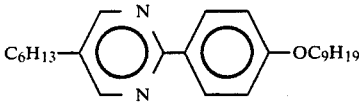 C$_6$H$_{13}$—(N,N-ring)—⌬—OC$_9$H$_{19}$ | 25 | | | | |
| CPEM-1 | 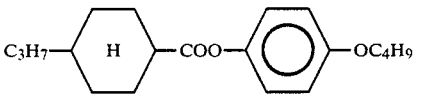 C$_3$H$_7$—H—COO—⌬—OC$_4$H$_9$ | 15 | 3–70 | 0.083 | 37 | −1.0 |
| | 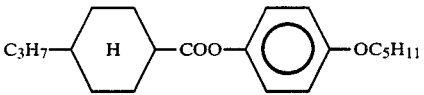 C$_3$H$_7$—H—COO—⌬—OC$_5$H$_{11}$ | 35 | | | | |
| | 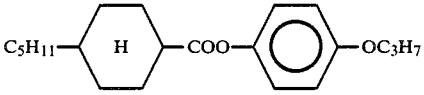 C$_5$H$_{11}$—H—COO—⌬—OC$_3$H$_7$ | 15 | | | | |
| | 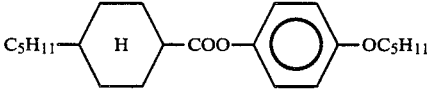 C$_5$H$_{11}$—H—COO—⌬—OC$_5$H$_{11}$ | 35 | | | | |
| CPEM-2 | 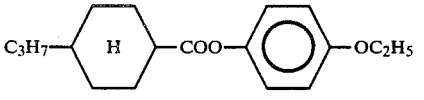 C$_3$H$_7$—H—COO—⌬—OC$_2$H$_5$ | 16.7 | −5∼73 | 0.085 | 21 | −1.2 |
| | 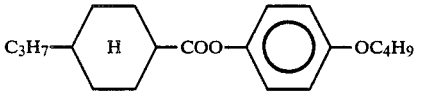 C$_3$H$_7$—H—COO—⌬—OC$_4$H$_9$ | 16.7 | | | | |
| | 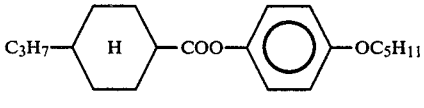 C$_3$H$_7$—H—COO—⌬—OC$_5$H$_{11}$ | 16.7 | | | | |
| | 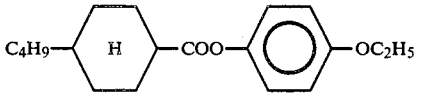 C$_4$H$_9$—H—COO—⌬—OC$_2$H$_5$ | 16.7 | | | | |
| | 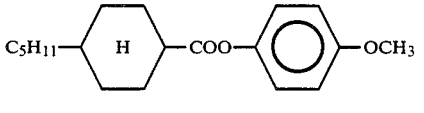 C$_5$H$_{11}$—H—COO—⌬—OCH$_3$ | 16.7 | | | | |

TABLE 1-continued

| Matrix designation | Matrix composition | Proportion (wt. %) | M.R. (°C.) | Δn (25° C. 525 nm) | Viscosity (c.p./20° C.) | Δε |
|---|---|---|---|---|---|---|
| | C₅H₁₁—H—COO—⌬—OC₂H₅ | 16.7 | | | | |

TABLE 2

| | Composition | Proportion (wt. %) | $T_{NI}$ (°C.) | $T_{SN}$ (°C.) | Δn (25° C. 525 nm) | Viscosity (c.p./ 20° C.) |
|---|---|---|---|---|---|---|
| Example 1 | FLVM-1 | 35 | | | | |
| | CPEM-1 | 35 | | | | |
| | C₃H₇—H—COO—⌬—OC₂H₅ | 10 | | | | |
| | C₂H₅—⌬—COO—⌬(Cl)—CN | 6 | 62.5 | −17.5 | 0.150 | 45 |
| | C₂H₅—⌬—COO—⌬(F)—CN | 2 | | | | |
| | C₄H₉—⌬—COO—⌬(F)—CN | 4 | | | | |
| | C₄H₉—⌬—COO—⌬—COO—⌬—C₄H₉ | 8 | | | | |
| Example 2 | FLVM-1 | 29 | | | | |
| | CPEM-1 | 29 | | | | |
| | C₃H₇—H—COO—⌬—OC₂H₅ | 10 | | | | |
| | C₂H₅—⌬—⌬—CN | 10 | | | | |
| | C₂H₅—⌬—COO—⌬—CN | 5 | 70.5 | −13 | 0.159 | 45 |
| | C₂H₅—⌬—COO—⌬(Cl)—CN | 5 | | | | |
| | C₄H₉—⌬—COO—⌬—COO—⌬—C₄H₉ | 8 | | | | |
| | C₄H₉—⌬—COO—⌬—COO—⌬—CH₂CH₂—H—C₃H₇ | 3 | | | | |
| | C₄H₉—⌬—CH₂CH₂—⌬—⌬—H—C₅H₁₁ | 2 | | | | |
| Example 3 | FLVM-1 | 25 | | | | |
| | CPEM-1 | 25 | | | | |
| | C₃H₇—H—COO—⌬—OC₂H₅ | 10 | | | | |

TABLE 2-continued

| | Composition | Proportion (wt. %) | $T_{NI}$ (°C.) | $T_{SN}$ (°C.) | $\Delta n \begin{pmatrix} 25° C. \\ 525 \text{ nm} \end{pmatrix}$ | Viscosity (c.p./20° C.) |
|---|---|---|---|---|---|---|
| | C₂H₅—⟨O⟩—⟨O⟩—CN | 10 | 68.0 | −18 | 0.152 | 28 |
| | C₃H₇—⟨H⟩—⟨O⟩—CN | 10 | | | | |
| | C₄H₉—⟨H⟩—⟨O⟩—CN | 5 | | | | |
| | C₅H₁₁—⟨H⟩—⟨O⟩—⟨O⟩—C₂H₅ | 10 | | | | |
| | C₅H₁₁—⟨H⟩—⟨O⟩—⟨O⟩—⟨H⟩—C₃H₇ | 5 | | | | |
| Example 4 | FLVM-1 | 25 | | | | |
| | CPEM-1 | 25 | | | | |
| | C₂H₅—⟨O⟩—COO—⟨O⟩(F)—CN | 4 | | | | |
| | C₃H₇—⟨O⟩—COO—⟨O⟩(F)—CN | 5 | | | | |
| | C₄H₉—⟨O⟩—COO—⟨O⟩(F)—CN | 4 | 64 | −10 | 0.143 | 49 |
| | C₂H₅—⟨O⟩—COO—⟨O⟩(Cl)—CN | 2 | | | | |
| | C₄H₉—⟨O(O)⟩—⟨O⟩—CN | 7 | | | | |
| | C₅H₁₁—⟨O(O)⟩—⟨O⟩—CN | 7 | | | | |
| | C₃H₇—⟨H⟩—⟨O⟩—OC₂H₅ | 9 | | | | |
| | C₄H₉—⟨O⟩—COO—⟨O⟩—COO—⟨O⟩—C₄H₉ | 6 | | | | |
| | C₄H₉—⟨O⟩—COO—⟨O⟩—COO—⟨O⟩—CH₂CH₂—⟨H⟩—C₃H₇ | 3 | | | | |
| | C₃H₇—⟨O⟩—COO—⟨O⟩—COO—⟨O⟩—CH₂CH₂—⟨H⟩—C₂H₅ | 3 | | | | |
| Example 5 | FLVM-2 | 34 | | | | |
| | CPEM-2 | 25 | | | | |
| | C₂H₅—⟨O⟩—COO—⟨O⟩(F)—CN | 4 | | | | |

TABLE 2-continued

| | Composition | Proportion (wt. %) | $T_{NI}$ (°C.) | $T_{SN}$ (°C.) | $\Delta n$ (25° C. 525 nm) | Viscosity (c.p./ 20° C.) |
|---|---|---|---|---|---|---|
| | $C_3H_7$—〇—COO—〇(F)—CN | 5 | | | | |
| | $C_4H_9$—〇—COO—〇(F)—CN | 4 | | | | |
| | $C_2H_5$—〇—COO—〇(Cl)—CN | 2 | 63 | −12 | 0.155 | 50 |
| | $C_4H_9$—(dioxane)—〇—CN | 7 | | | | |
| | $C_5H_{11}$—(dioxane)—〇—CN | 7 | | | | |
| | $C_4H_9$—〇—COO—〇—COO—〇—$C_4H_9$ | 6 | | | | |
| | $C_4H_9$—〇—COO—〇—COO—〇—CH$_2$CH$_2$—(H)—$C_3H_7$ | 3 | | | | |
| | $C_3H_7$—〇—COO—〇—COO—〇—CH$_2$CH$_2$—(H)—$C_2H_5$ | 3 | | | | |
| Example 6 | FLVM-1 | 20 | | | | |
| | CPEM-2 | 49 | | | | |
| | $C_4H_9$—(pyrimidine)—〇—CN | 8 | | | | |
| | $C_5H_{11}$—(pyrimidine)—〇—CN | 8 | 65 | −13 | 0.148 | 38 |
| | $C_7H_{15}$—(pyrimidine)—〇—CN | 7 | | | | |
| | $C_3H_7$—(H)—COO—〇—CH$_2$CH$_2$—(H)—$C_3H_7$ | 6 | | | | |
| | $C_4H_9$—〇—COO—〇—COO—〇—CH$_2$CH$_2$—(H)—$C_3H_7$ | 2 | | | | |
| Example 7 | FLVM-1 | 20 | | | | |
| | CPEM-1 | 30 | | | | |
| | $C_2H_5$—〇—COO—〇(F)—CN | 5 | | | | |
| | $C_4H_9$—〇—COO—〇(F)—CN | 5 | | | | |
| | $C_2H_5$—〇—COO—〇(Cl)—CN | 3 | | | | |

TABLE 2-continued

| Composition | | Proportion (wt. %) | $T_{NI}$ (°C.) | $T_{SN}$ (°C.) | $\Delta n \begin{pmatrix} 25° C. \\ 525 nm \end{pmatrix}$ | Viscosity (c.p./ 20° C.) |
|---|---|---|---|---|---|---|
| | C4H9—[pyrazine]—[phenyl]—CN | 8 | 62 | −25 | 0.147 | 51 |
| | C5H11—[pyridazine]—[phenyl]—CN | 8 | | | | |
| | C3H7—[phenyl]—COO—[phenyl]—OC2H5 | 10 | | | | |
| | C4H9—[phenyl]—COO—[phenyl]—COO—[phenyl]—C4H9 | 8 | | | | |
| | C4H9—[phenyl]—COO—[phenyl]—COO—[phenyl]—CH2CH2—[H]—C3H7 | 3 | | | | |
| Example 8 | FLVM-1 | 35 | | | | |
| | PDM-1 | 10 | | | | |
| | CPEM-1 | 34 | | | | |
| | C2H5—[phenyl]—COO—[phenyl(Cl)]—CN | 6 | 60 | −12 | 0.151 | 51 |
| | C2H5—[phenyl]—COO—[phenyl(F)]—CN | 2 | | | | |
| | C4H9—[phenyl]—COO—[phenyl(F)]—CN | 4 | | | | |
| | C4H9—[phenyl]—COO—[phenyl]—COO—[phenyl]—C4H9 | 9 | | | | |
| Example 9 | FLVM-1 | 29 | | | | |
| | PDM-2 | 29 | | | | |
| | CPEM-2 | 10 | | | | |
| | C2H5—[phenyl]—[phenyl]—CN | 10 | 61 | −12 | 0.175 | 52 |
| | C2H5—[phenyl]—COO—[phenyl]—CN | 5 | | | | |
| | C2H5—[phenyl]—COO—[phenyl(Cl)]—CN | 5 | | | | |
| | C4H9—[phenyl]—COO—[phenyl]—COO—[phenyl]—C4H9 | 7 | | | | |
| | C4H9—[phenyl]—COO—[phenyl]—COO—[phenyl]—CH2CH2—[H]—C3H7 | 5 | | | | |
| Example 10 | FLVM-2 | 20 | | | | |
| | PDM-2 | 20 | | | | |
| | CPEM-2 | 30 | | | | |
| | C4H9—[pyrazine]—[phenyl]—CN | 10 | 61 | −20 | 0.153 | 45 |

TABLE 2-continued

| | Composition | Proportion (wt. %) | $T_{NI}$ (°C.) | $T_{SN}$ (°C.) | $\Delta n$ (25° C. 525 nm) | Viscosity (c.p./ 20° C.) |
|---|---|---|---|---|---|---|
| | C$_4$H$_9$—[dioxane]—[Ph]—CN | 10 | | | | |
| | C$_4$H$_9$—[Ph]—COO—[Ph]—COO—[Ph]—C$_4$H$_9$ | 7 | | | | |
| | C$_4$H$_9$—[Ph]—COO—[Ph]—COO—[Ph]—CH$_2$CH$_2$—[H]—C$_3$H$_7$ | 3 | | | | |
| Example 11 | FLVM-1 | 25 | | | | |
| | PDM-2 | 25 | | | | |
| | CPEM-2 | 10 | | | | |
| | C$_2$H$_5$—[Ph]—[Ph]—CN | 10 | | | | |
| | C$_4$H$_9$—[H]—[Ph]—CN | 10 | 62 | −10 | 0.175 | 40 |
| | C$_3$H$_7$—[Ph]—COO—[Ph(F)]—CN | 5 | | | | |
| | C$_8$H$_{11}$—[H]—[Ph]—[Ph]—C$_2$H$_5$ | 10 | | | | |
| | C$_5$H$_{11}$—[H]—[Ph]—[Ph]—[H]—C$_3$H$_7$ | 5 | | | | |
| Example 12 | FLVM-1 | 20 | | | | |
| | PDM-2 | 10 | | | | |
| | CPEM-2 | 25 | | | | |
| | C$_2$H$_5$—[Ph]—COO—[Ph]—CN | 2 | | | | |
| | C$_2$H$_5$—[Ph]—COO—[Ph(F)]—CN | 5 | | | | |
| | C$_4$H$_9$—[Ph]—COO—[Ph(F)]—CN | 5 | 62 | −14 | 0.161 | 52 |
| | C$_2$H$_5$—[Ph]—COO—[Ph(Cl)]—CN | 3 | | | | |
| | C$_4$H$_9$—[pyrazine]—[Ph]—CN | 8 | | | | |
| | C$_5$H$_{11}$—[pyrazine]—[Ph]—CN | 8 | | | | |
| | C$_4$H$_9$—[Ph]—COO—[Ph]—COO—[Ph]—C$_4$H$_9$ | 9 | | | | |
| | C$_4$H$_9$—[Ph]—COO—[Ph]—COO—[Ph]—CH$_2$CH$_2$—[H]—C$_3$H$_7$ | 5 | | | | |

TABLE 2-continued

| Composition | | Proportion (wt. %) | $T_{NI}$ (°C.) | $T_{SN}$ (°C.) | $\Delta n \left(\begin{array}{c} 25°\text{ C.} \\ 525 \text{ nm} \end{array}\right)$ | Viscosity (c.p./ 20° C.) |
|---|---|---|---|---|---|---|
| Comparative Example 1 | $C_3H_7$—(H)—(O)—CN | 45 | | | | |
| | $C_5H_{11}$—(H)—(O)—CN | 30 | 73 | <−25 | 0.13 | 27 |
| | $C_7H_{11}$—(H)—(O)—CN | 15 | | | | |
| | $C_5H_{11}$—(H)—(O)—(O)—CN | 10 | | | | |
| Comparative Example 2 | $C_5H_{11}$—(O)—(O)—CN | 24 | | | | |
| | $C_7H_{15}$—(O)—(O)—CN | 36 | 64 | <−25 | 0.22 | 43 |
| | $C_8H_{17}O$—(O)—(O)—CN | 25 | | | | |
| | $C_5H_{11}$—(O)—(O)—(O)—CN | 15 | | | | |

Each of the liquid crystalline composition in the above Examples and Comparative Examples was filled in three display cells having diffent cell gaps. In each cell, the threshold effective voltage ($V_{th}$) and saturation effective voltage ($V_{sat}$) were measured, and the gamma value was calculated from $T_{th}$ and $V_{sat}$. the measurement, $V_{th}$ was taken as an effective voltage which gave a luminance of 10% at a temperature of 25° C. and a viewing angle of 0°, and $V_{sat}$, as an effective voltage which gave a luminance of 80% at a temperature of 25° C. and a viewing angle of 0°.

The results are shown in Table 3. In the table, d represents the cell gap.

TABLE 3

| | d = 6 μm | | d = 8 μm | | d = 10 μm | |
|---|---|---|---|---|---|---|
| | Vth(v) | γ | Vth(v) | γ | Vth(v) | γ |
| Example 1 | 2.19 | 1.25 | 2.20 | 1.30 | 2.22 | 1.30 |
| Example 2 | 1.97 | 1.26 | 2.00 | 1.30 | 2.00 | 1.31 |
| Example 3 | 1.83 | 1.28 | 1.90 | 1.32 | 1.93 | 1.33 |
| Example 4 | 1.51 | 1.26 | 1.53 | 1.27 | 1.54 | 1.28 |
| Example 5 | 1.48 | 1.24 | 1.51 | 1.29 | 1.51 | 1.28 |
| Example 6 | 1.68 | 1.25 | 1.70 | 1.28 | 1.71 | 1.27 |
| Example 7 | 1.48 | 1.26 | 1.50 | 1.30 | 1.50 | 1.29 |
| Example 8 | 2.17 | 1.24 | 2.18 | 1.31 | 2.17 | 1.29 |
| Example 9 | 1.82 | 1.25 | 1.84 | 1.29 | 1.86 | 1.29 |
| Example 10 | 1.77 | 1.25 | 1.78 | 1.29 | 1.76 | 1.31 |
| Example 11 | 1.81 | 1.28 | 1.83 | 1.33 | 1.84 | 1.33 |
| Example 12 | 1.43 | 1.27 | 1.45 | 1.30 | 1.45 | 1.31 |
| Comparative Example 1 | 1.80 | 1.37 | 1.82 | 1.37 | 1.84 | 1.38 |
| Comparative Example 2 | 1.68 | 1.37 | 1.75 | 1.40 | 1.72 | 1.38 |

The foregoing results clearly demonstrate that the liquid crystalline compositions of this invention are markedly improved over the comparative liquid crysalline compositions in gamma characteristics which are essential to high level multiplexing driving, and that the liquid crystalline compositions of this invention have optical anisotropy sufficient for preventing the formation of a light interference color.

Since the liquid crystalline compositions of this invention have sharp voltage-luminance characteristics as described hereinabove in detail, they have excellent operability in a high level multiplexing driving system, and do not permit formation of an inteference color of light on a display surface.

What is claimed is:

1. A nematic liquid crystalline composition comprising (a) at least one compound represented by the general formala

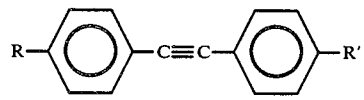

wherein R represents a linear alkyl group having 1 to 10 carbon atoms, and R' represents a linear alkyl group having 1 to 10 carbon atoms or a linear alkoxy group having 1 to 10 carbon atoms, (b) at least one compound represented by the general formula

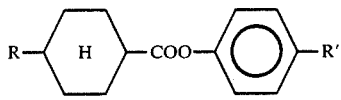

wherein R represents a linear alkyl group having 1 to 10 carbon atoms, R' represents a linear alkoxy group having 1 to 10 carbon atoms, and
(c) at least one compound selected from the group consisting of compounds represented by the general formula

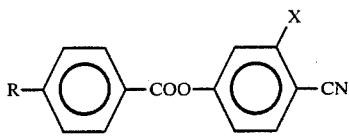

wherein R represents a linear alkyl group having 1 to 10 carbon atoms, and X represents a hydrogen, chlorine or fluorine atom, and compounds represented by the general formula

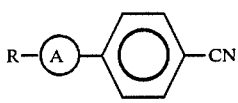

wherein R represents a linear alkyl group having 1 to 10 carbon atoms, and

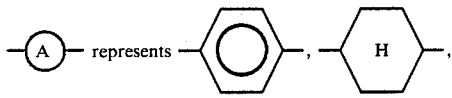

-(A)- represents 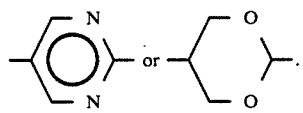

2. A nematic liquid crystalline composition comprising
(a) at least one compound represented by the general formula

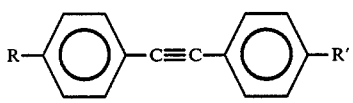

wherein R represents a linear alkyl group having 1 to 10 carbon atoms, and R' represents a linear alkyl group having 1 to 10 carbon atoms or a linear alkoxy group having 1 to 10 carbon atoms,
(b) at least one compound represented by the general formula

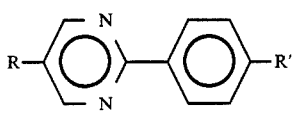

wherein R represents a linear alkyl group having 1 to 10 carbon atoms, and R' represents a linear alkoxy group having 1 to 10 carbon atom,
(c) at least one compound represented by the general formula

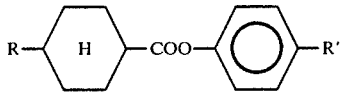

wherein R represents a linear alkyl group having 1 to 10 carbon atoms, and R' represents a linear alkoxy group having 1 to 10 carbon atoms, and
(d) at least one compound selected from the group consisting of compounds represented by the general formula

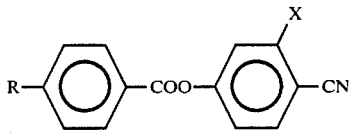

wherein R represents a linear alkyl group having 1 to 10 carbon atoms, and X represents a hydrogen, chlorine or fluorine atom, and compounds represented by the general formula

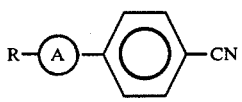

wherein R represents a linear alkyl group having 1 to 10 carbon atoms, and

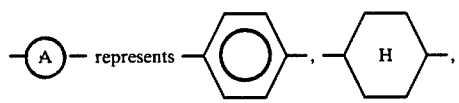

-(A)- represents 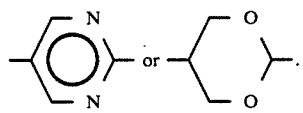

3. The nematic liquid crystalline composition of claim 2 which comprises 15 to 40% of the at least one compound (a), 5 to 30% of the at least one compound (b), 5 to 40% of the at least one compound (c), 5 to 40% for the at least one compound (d), and from 0 to 20% by weight of at least one other nematic liquid crystalline compound selected from the group consisting of compounds of the general formula (6) to (15)

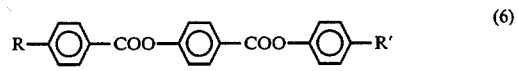 (6)

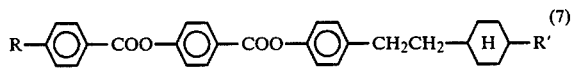 (7)

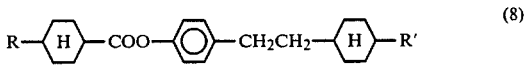 (8)

-continued

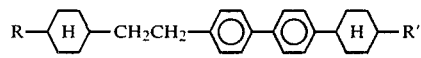 (9)

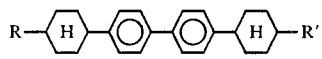 (10)

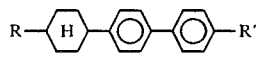 (11)

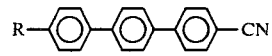 (12)

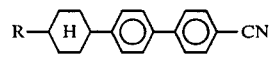 (13)

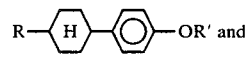 (14) and

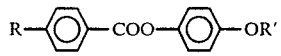 (15)

wherein in each of formula (6) to (15) R and R' each represent a linear alkyl group having from 1 to 10 carbon atoms.

4. The nematic liquid crystalline composition of claim 1 which comprises from 10 to 45% of the at least one compound (a), from 20 to 55% by weight of the at least one compound (b), from 5 to 35% by weight of the at least one compound (c), and from 0 to 25% by weight of at least one other nematic liquid crystalline compound selected from compounds of general formulae (6) to (15)

$$R-\bigcirc-COO-\bigcirc-COO-\bigcirc-R' \quad (6)$$

$$R-\bigcirc-COO-\bigcirc-COO-\bigcirc-CH_2CH_2-H-R' \quad (7)$$

$$R-H-COO-\bigcirc-CH_2CH_2-H-R' \quad (8)$$

$$R-H-CH_2CH_2-\bigcirc-\bigcirc-H-R' \quad (9)$$

$$R-H-\bigcirc-\bigcirc-H-R' \quad (10)$$

$$R-H-\bigcirc-\bigcirc-R' \quad (11)$$

$$R-\bigcirc-\bigcirc-\bigcirc-CN \quad (12)$$

$$R-H-\bigcirc-\bigcirc-CN \quad (13)$$

$$R-H-\bigcirc-OR' \text{ and} \quad (14)$$

$$R-\bigcirc-COO-\bigcirc-OR' \quad (15)$$

wherein in each of formulae (6) to (15) R and R' each represent a linear alkyl group having from 1 to 10 carbon atoms.

* * * * *